Aug. 21, 1928.
G. H. HINES
1,681,613
POWER CONTROL DEVICE
Filed Feb. 2, 1927     6 Sheets-Sheet 1
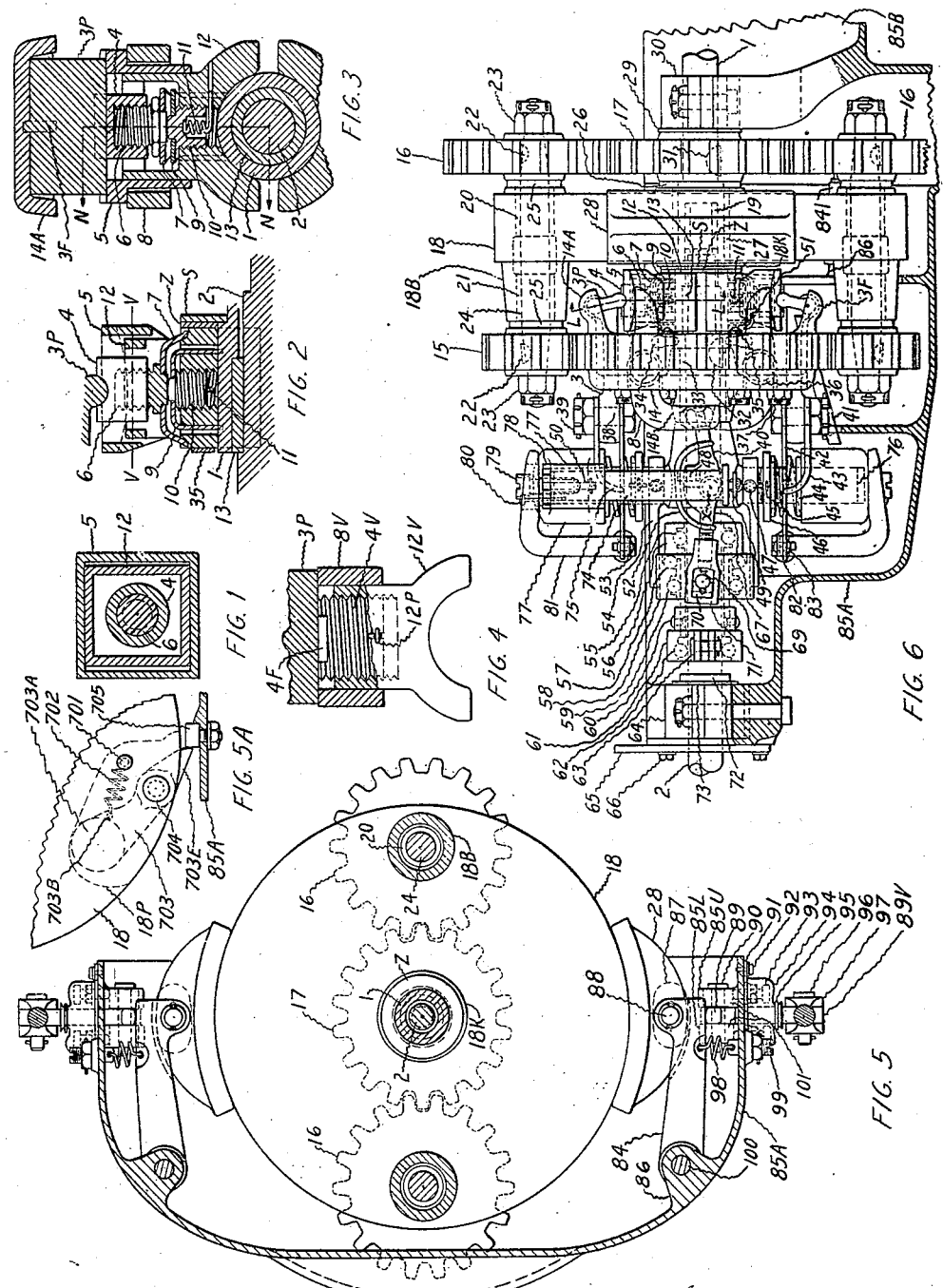
Gail H. Hines
INVENTOR

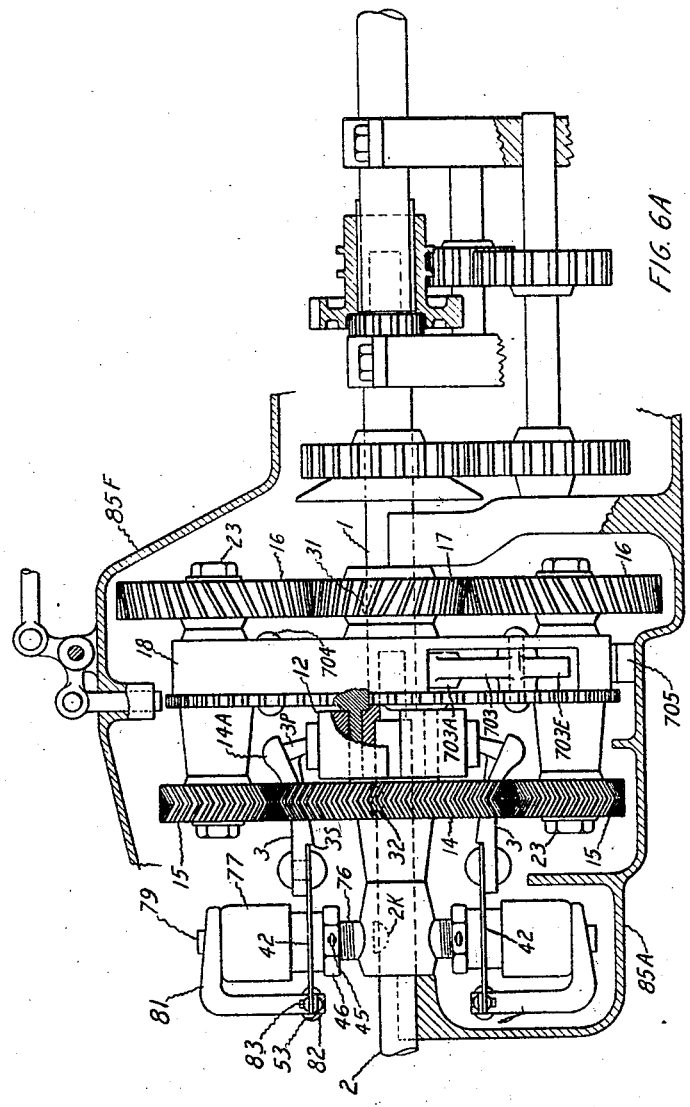

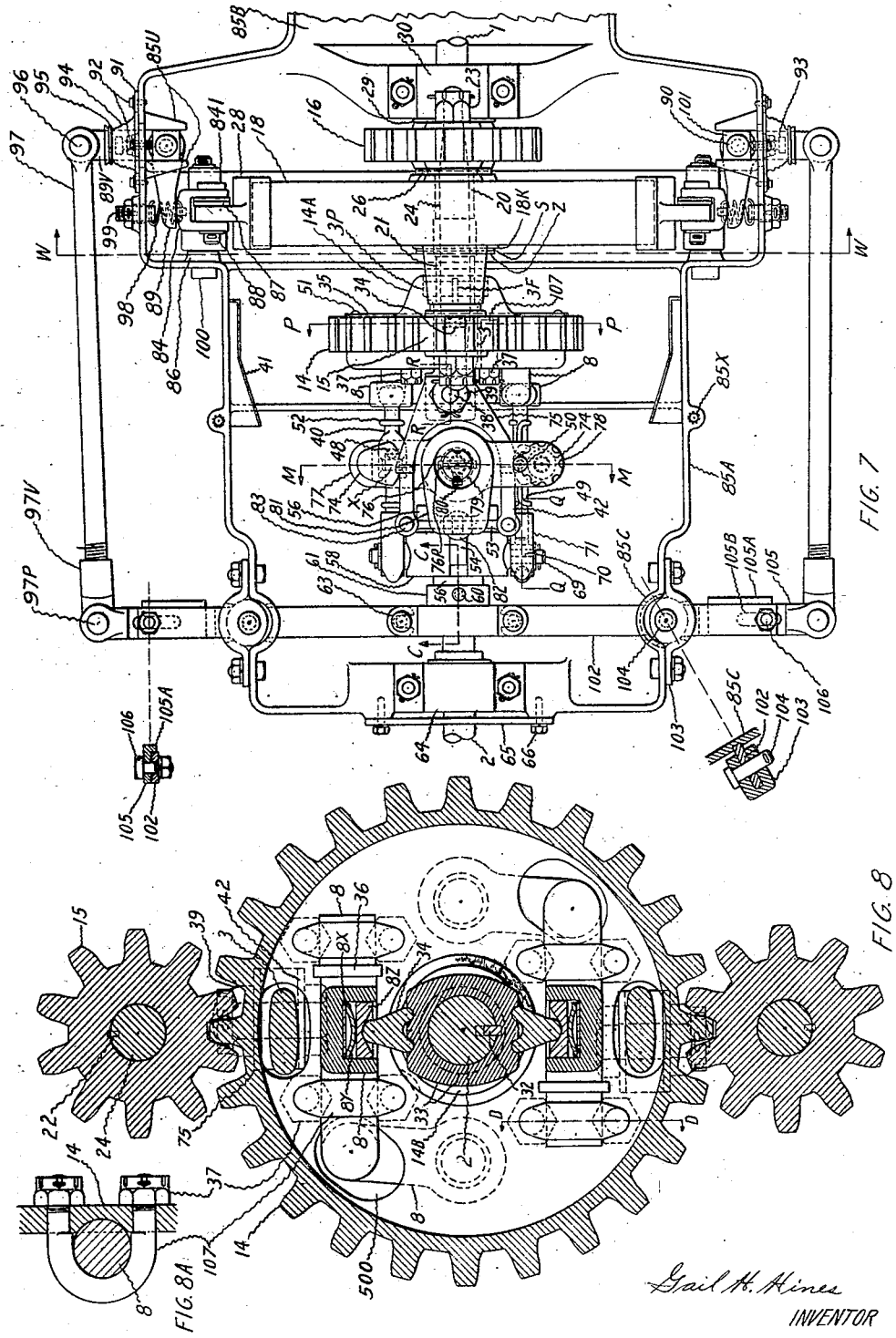

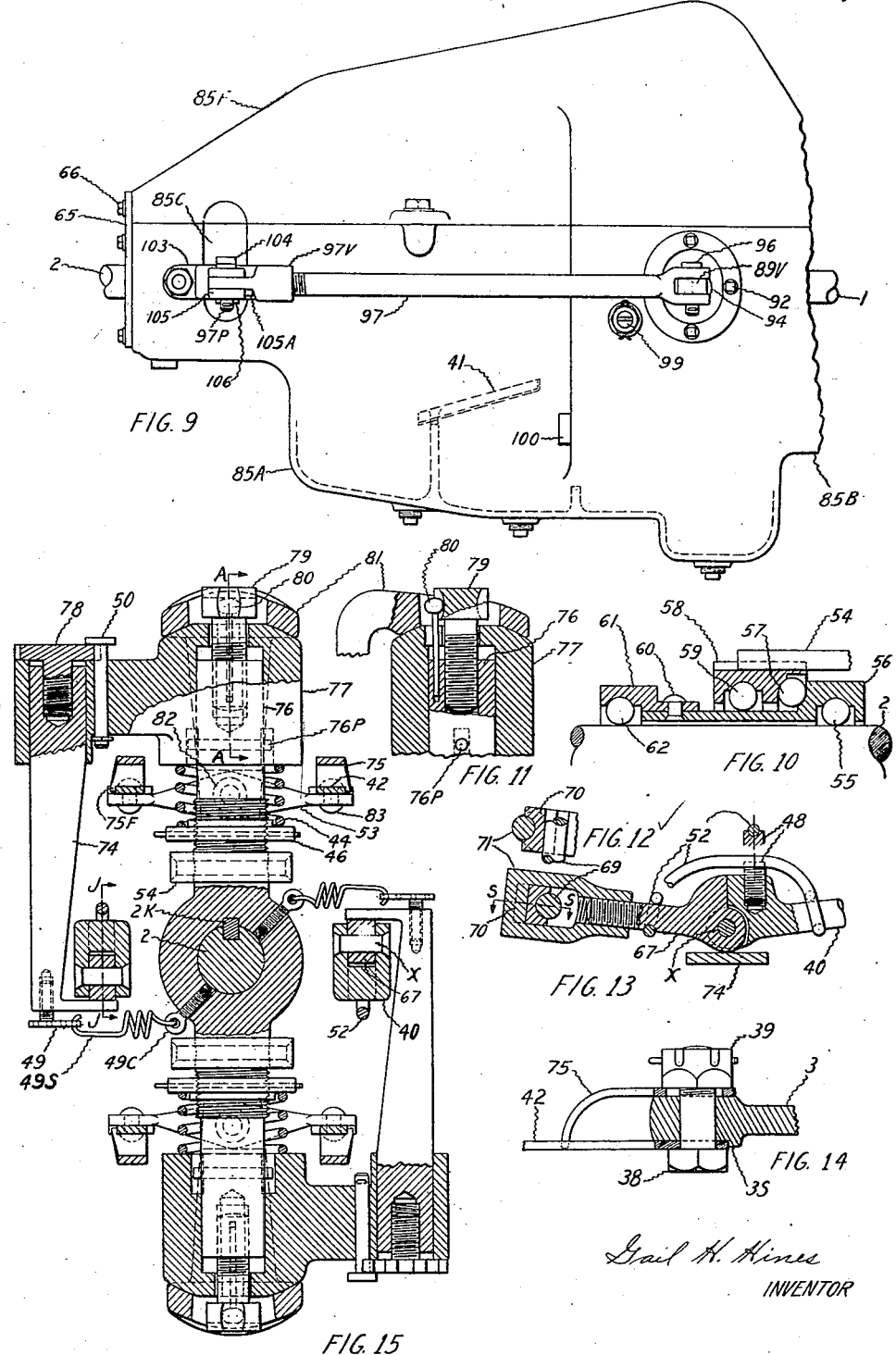

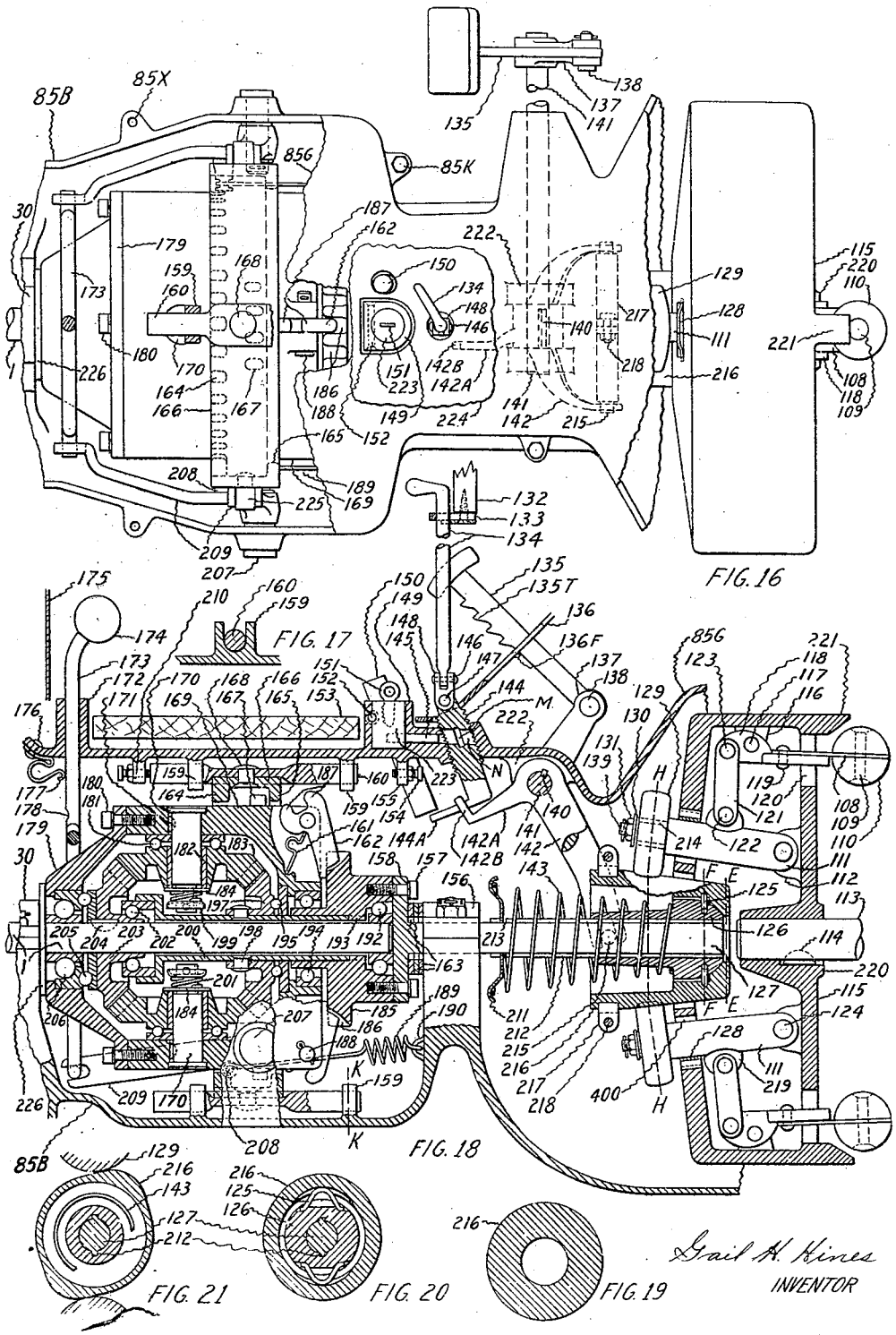

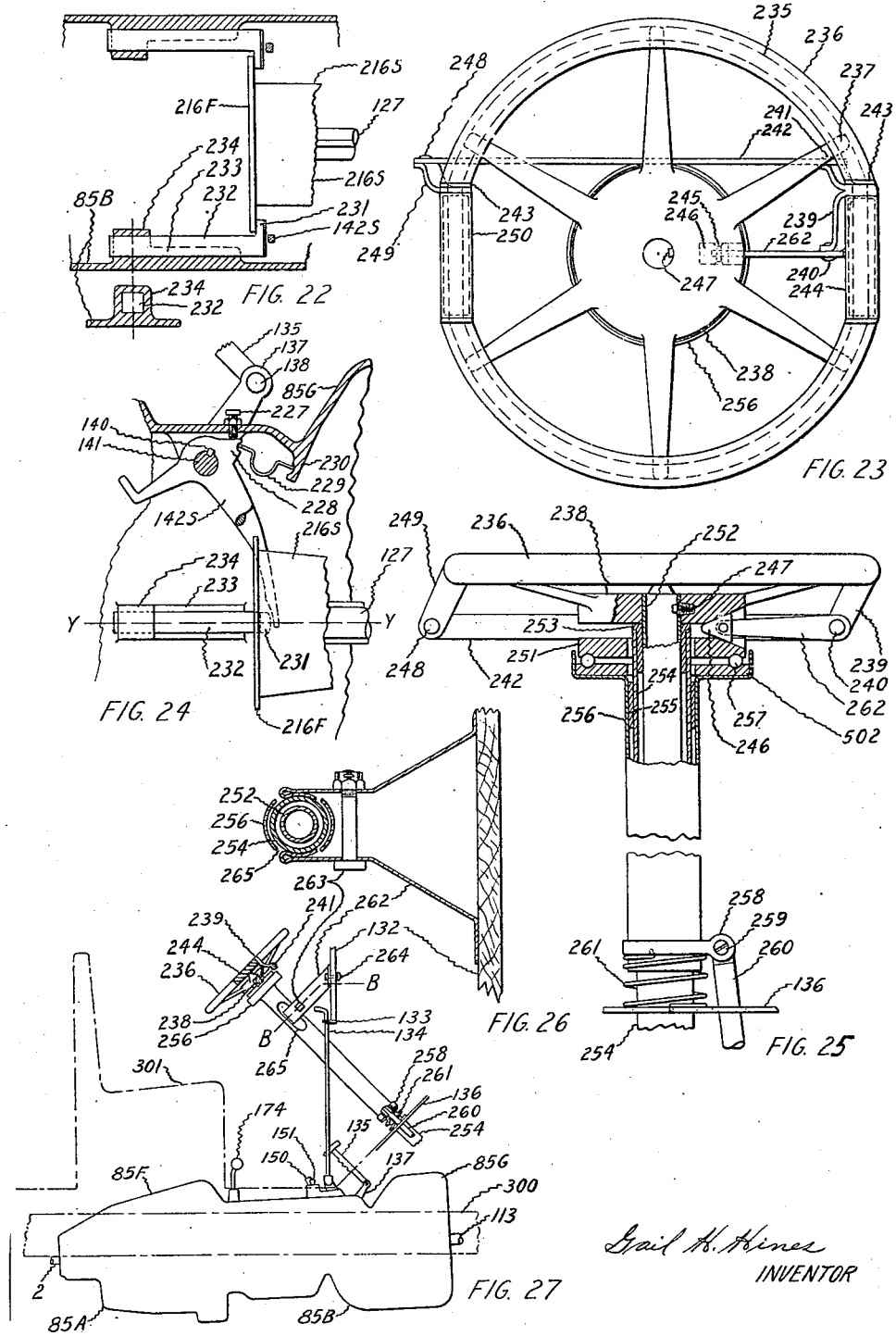

Patented Aug. 21, 1928.

1,681,613

UNITED STATES PATENT OFFICE.

GAIL H. HINES, OF LANSING, MICHIGAN.

POWER-CONTROL DEVICE.

Application filed February 2, 1927. Serial No. 165,407.

My invention aims, in general, to provide a novel power control device having some suitably well coordinated mechanisms arranged compactly in a form well adapted to be used in fitting relation with the other necessary elements in an automobile of ordinary design substantially to attain the desired result without suffering a number of certain annoying disadvantages now reluctantly tolerated in other devices of this nature employed to attain the same ultimate results.

With a view to most clearly set forth the objects of my invention I may enumerate some of the disadvantages of automobile power-control devices now in common use, and such as are not encountered in the use of my improved device. Therefore, at this point, it is well to briefly refer to some of the more familiar objections and disadvantages of other power-control devices.

In particular, it is annoying to have a transmission device in which gearing must be manually shifted to obtain the suitable power ratio which necessarily varies according to conditions of road and load.

Also, sliding gear transmissions are objectionable because they are necessarily more noisy than if herringbone or spiral gears are used.

Likewise, a transmission which requires thinking to shift the gearing is efficient only in proportion to the judgment of the operator.

Further, a transmission which employs only the conventional three speeds ahead is limited within such certain confinement.

I am familiar with power-control devices in which it is common practice to employ the hands of the operator to steer an automobile and to shift the transmission gears, while the right foot is employed to manipulate a brake actuator and a motor throttle, and wherein the brake actuator and the throttle actuator are necessarily in close proximity, one to the other, and in excitement are easily mistaken, one for the other, and being actuated by the same general movements of the foot it is obvious why some painful accidents have occurred when the throttle actuator was mistakenly manipulated at a critical moment when it was fully intended to manipulate the brake actuator.

Also some of the commonly used power-control devices employ a transmission mechanism in which the efficiency is reduced by necessarily dragging along a countershaft.

Furthermore, a common fault is that the range of intermediate speeds between low and high is so narrow that a relatively high rear axle ratio must be used.

Any citation of the faults of other devices is only intended to clearly set forth the aim of my invention and the reasons why I have employed certain novelties of construction; and it is in no way intended to question the merits of other devices.

In its best form my invention affords the advantages of mechanical design created by a novel association of parts to be fittingly adapted to use in an automobile so that the mechanism is conveniently, easily, and safely controlled; the principal object being to provide a transmission mechanism in which the gearing ratios between an ultimate high and an ultimate low are infinite in number and each ratio is selected automatically according to the conditions of road or load to be most effectively adapted for the proper transmission of power for the most efficient and economical driving of an automobile.

While the aim is particularly directed toward certain substantial refinements and simplicity of mechanisms consistent with the qualities of durability and perfection of operation to attain an automatic transmission mechanism, I have, by my novel selection and arrangement of parts also provided means whereby other desirable objects have likewise been attained.

Other objects of the invention are to provide in a transmission mechanism gears which are of the silent type such as herringbone or spiral gears employed to obtain a plurality of gearing ratios, and to adapt the gears and their carriers to be carried on a main shaft and to function as a fly wheel when the automobile is being driven in high gear.

Furthermore, another object is to provide a reversing mechanism in which the gears and their carriers are adapted to be carried balanced on a main driving shaft in a manner to be rotated as a fly wheel when the automobile is being driven forward.

Another object is to provide a clutch mechanism in which centrifugal force, which is varied in intensity by manipulating the motor throttle, is employed to gradually take power from a live motor to move a car from a state of rest and to accelerate the motion until spring actuated clutch members effect a positive drive.

Another object is to provide a clutch engaging mechanism which becomes free and frictionless when the clutch is engaged.

Another object is to provide a motor throttle actuator and a steering wheel adapted to be manipulated simultaneously by either or both hands.

Another object is to provide a lock mechanism to lock the device into inoperative condition; and inability to start the motor when clutched into driving relation with the transmission mechanism.

To accomplish the foregoing and related objects, said invention, then, consists of the means hereinafter fully described, and particularly pointed out in claims.

The annexed drawings and the following description set forth in detail certain mechanism embodying the invention, such disclosed means constituting, however, but one of various mechanical forms in which the principle of the invention may be used.

Figure 1 is a sectional view taken on line V—V of Fig. 2. Fig. 2 is a sectional view taken on line N—N of Fig. 3. Fig. 3 is a sectional view to enlarged scale taken on line L—L of Fig 6. Fig. 4 is a fragmental view showing an equivalent construction for mechanism to be substituted for the construction shown in Fig. 3. Fig. 5 is a sectional view taken on line W—W of Fig. 7. Fig. 5ᴬ is a fragmental view showing an equivalent construction of a mechanism for preventing reverse rotation in the drum 18. Fig. 6 is a sectional side elevational view showing one embodiment of my automatic variable speed transmission mechanism. Fig. 6ᴬ is a sectional side elevational view showing an equivalent construction to be substituted for the particular construction shown in Fig. 6. Fig. 7 is a plan view of the mechanism shown in Fig. 6. Fig. 8 is a sectional view to enlarged scale taken on line P—P of Fig. 7. Fig. 8ᴬ is a sectional view taken on line D—D of Fig. 8. Fig. 9 is a side elevational view of the encased mechanism shown in Fig. 6. Fig. 10 is a sectional view to enlarged scale taken on line C—C of Fig 7. Fig. 11 is a sectional view taken on the line A—A of Fig. 15. Fig. 12 is a sectional view taken on line S—S of Fig. 13. Figure 13 is a sectional view to enlarged scale taken on line Q—Q of Fig. 7 and to the same scale on line J—J of Fig. 15. Fig. 14 is a sectional view to enlarged scale taken on line R—R of Fig. 7. Fig. 15 is a sectional view to enlarged scale taken on line M—M of Fig. 7. Fig. 16 is a plan view of the mechanism shown in Fig. 18. Fig. 17 is a sectional view taken on line K—K of Fig. 18. Fig. 18 is a fragmental view to enlarged scale, part a side elevation and in part a vertical section showing a clutch and reversing mechanism and certain control mechanisms. Fig. 19 is a sectional view taken on line E—E of Fig. 18. Fig. 20 is a sectional view taken on line F—F of Fig. 18. Fig. 21 is a sectional view taken on line H—H of Fig. 18. Fig. 22 is a sectional view taken on line Y—Y of Fig. 24. Fig. 23 is a plan view of the mechanism shown in Fig 25. Fig. 24 is a fragmental view, part a side elevation and in part a vertical section showing an equivalent construction for mechanism to be adapted as a clutch shifting device. Fig. 25 is a fragmental view to enlarged scale, part a side elevation and in part a vertical section showing a steering wheel and throttle control mechanism. Fig. 26 is a sectional view to enlarged scale taken on line B—B of Fig. 27. Fig. 27 is a general, outline side elevational view of my improved device showing a convenient relative location of parts as assembled in an automobile.

To avoid confusion I may first describe the construction and then directly proceed to a full understanding of my invention which is practical only because of the certain novel and unique involution of principles.

In general, the invention resides in three separate and distinct units:—an automatically actuated, variable gear-ratio, power transmission mechanism, a reversing mechanism, and a clutch mechanism. Each of these has been developed and associated together especially to provide a power-control device of the highest efficiency in operation regardless of initial expense; and in passing thru this specification one will note that I have, in many instances, shown some distinct units mechanisms which are employed to render the device as a whole to be operated in a manner to produce the highest efficiency in operation, for which other commonly used units of cheaper construction may be substituted in lieu of my highly refined and efficient units. For instance, most any of the commonly known clutch mechanisms now ordinarily used in automobiles may be substituted for the clutch mechanism I have shown; and there are, also, reversing mechanisms of cheaper construction which are common and which may be adapted for use in my device in lieu of the highly efficient reversing mechanism I have chosen to employ.

Other substitutions of commonly used parts and combinations of parts will be obvious; however, in viewing my invention there are certain fine points to be grasped which I have necessarily evolved to elevate the device above a mere theory and make it thoroughly practical.

Inasmuch as certain mechanisms are, generally, made up of two like parts arranged symmetrically in pairs I shall hereinafter indicate like parts, thusly arranged, as being plural but designated by the same single symbol.

In view of the foregoing, on a motor crankshaft 113 is keyed a flywheel 115 by means of a key 114. In the two pairs of brackets 112 which are integral with the flywheel 115 on opposite sides of the shaft 113 are swingingly mounted a pair of levers 111 on pins 124. The levers 111 are of suitable length to extend from the brackets 112 in the front wall of the flywheel 115 thru guide slots 400 in the rear wall of said flywheel. On the rear extended portions of the levers 111 are rotatably mounted the rollers 129 on bushings 214 which are pressed tightly into said rollers. Washers 130 and nuts 131 on the threaded extensions 139 of the levers 111 hold the rollers 129 in operative position. Another pair of levers 118 are fulcrumed in two pairs of brackets 116 integral with and extending inward from the rim of the flywheel 115. Riveted to the long ends of the levers 118 are the springs 108 which have weights 110 secured thereon by means of rivets 109. The levers 118 are disposed to be guided in swinging movement by the slots 120 in the front wall of the flywheel 115, and the weights 110 are adapted to be carried disposed at the front of said flywheel and to be limited in outward movement by a pair of lugs 221 integral with the flywheel. A pair of connecting links 121 join the short ends of the levers 118 to the levers 111.

An opening is formed in the rear wall of the flywheel 115 to accommodate the passage of a cam 216 which is mounted on a hub 126 which in turn, is mounted on a splined shaft 127 so that the combined hub and cam are slidable longitudinally on the shaft 127 but cannot turn thereon. The cam 216 is mounted on the hub 126 by being engaged contacting, one to the other, at their forward ends as a ball and socket joint and held thusly joined, with separating clearance toward the rear, by means of a pair of springs 125 connecting the hub 126 and the cam 216 to effect a universal shock absorbing joint. After the springs 125 are compressed into the sockets containing them in the hub 126 the cam 216 is snapped into assembled position and held thusly assembled by means of the tensioned springs 125. The coiled spring 143 is engaged at its forward end by the hub 126 and at its rear end engages a seat or holder 211. The holder 211 has a central opening formed to fit the shaft 127 and the keys or splines 212 of the shaft 127. Notches 213 are formed into the splines 212 so that when the holder 211 is rotated for a part of a revolution the notches in the holder 211 which are formed to fit the splines 212 are out of alignment with them and the holder 211 is held from moving longitudinally on the shaft 127. The spring 143 is tensioned to normally force the cam 216 forward to be engaged by the rollers 129. The cam 216 has the periphery of a circle at E—E as shown in Fig. 19, and at H—H has the periphery of an ellipse as shown in Fig. 21, and the periphery of each of an infinite number of sections taken betwen H—H and E—E is an ellipse with the major and minor axes becoming more nearly equal as the sections approach nearer to E—E. The major axis of the section of said cam at H—H is greater than the shortest distance between the rollers 129 when they are at the full extent of their outward movement, and the levers 111 are in engagement with the pair of buffer springs 128 fixedly secured within widened outer portions of the guide slots 400. A split collar 217 is carried in the annular groove disposed in and adjacent to the rear of the cam 216. The bolts 218 clamp together the two halves of the collar 217, and on the horizontal centerline of the collar 217 is disposed a pair of studs 215 projecting outward to be engaged by yoke ends of a bifurcated lever 142 which is secured fixedly on the shaft 141 by means of a key 140. The shaft 141 is rotatably mounted in the case cover 85$^G$ and has thereon fixedly secured at its outer end a lever 137 which, in turn, is joined to a treadle 135. The treadle 135 is swingingly mounted upon a pin 138 in the lever 137, and on the lower edge of the treadle a series of notches 135$^T$ are disposed to be engaged with a flange 136$^F$ formed in a floor plate 136. A threaded shank 144 is rotatably carried, screwed into a tapped boss formed integral with the case cover 85$^G$. Secured on the upper end of the shank 144 is adapted a universal joint comprising the joint body 148 and the pins 146 and 147 joining with the extension rod 134 and the shank 144 respectively. Adjacent to the upper end of the extension rod 134 is a bracket 133 secured to a body element 132 such as the instrument board or the like. The extension rod 134 is journaled for rotation in the bracket 133, and at its upper end is formed a handle disposed relative to the body element 132 so that the extension rod 134 may rotate thru at least ninety degrees to, in turn, rotate the threaded shank 144 which has formed integral with its lower end a foot 144$^A$ designed to be swung alternately to be disposed directly under the lower end of a motor starter plunger 150 and a lever extension 142$^A$ of the lever 142. A second lever extension 142$^B$ is disposed perpendicular to extension 142$^A$ so that the foot 144$^A$ cannot be passed over the extension 142$^A$ and can be passed under the extension 142$^A$ only when said latter extension is elevated by a downward movement of the treadle 135. Into a boss 149 of the case cover 85$^G$ is disposed a lock mechanism 223 held fixedly secured by a countersunk head rivet 152 engaging with both the boss 149 and the lock mechanism 223. The lock mechanism 223 is actuated by a key 151 and effects to move a bolt 145 for engagement with either of two rectangular holes M and N perpendicular, one to the other, each disposed passing thru the shank 144. The shaft 127 is journaled for rotation in a split bearing 156 and has formed on its rear end a flange 158 perpendicular to its axis. A shaft coupling 185 joins the shaft 127 to the tubular shaft 200; cap screws 157 secure the shaft 127 to the coupling 185, while the teeth 193 of the coupling 185 mesh with suitably formed corresponding notches disposed in the forward end of the tubular shaft 200. Passing thru the tubular shaft 200 is the transmission driving shaft 1 which is journaled for rotation in a split bearing 30. The tubular shaft 200 and the shaft coupling 185 are mounted upon ball bearings 202 and 192, respectively, which are disposed to allow the transmission driving shaft 1 and the tubular shaft 200 to rotate relative to one another. A cage 169 has a cage cap 179 secured to it by means of cap screws 180, and said cage and cage cap are mounted for rotation as a unit on ball bearings 206 and 194 which, in turn, are carried, respectively, on the shaft 1 and a rearward projecting sleeve portion of the shaft coupling 185. A pair of bevel gears 183, carrying bushings 182, are mounted for rotation on stud shafts 170 which, in turn, are inwardly, radially carried, fixedly secured disposed in the cage 169 by means of keys 171. A pair of springs 201 each has one end engaging with a spring retainer 199 and the other end engaging with a lip washer 184 forcing the washers against the bevel gears 183 and the gears against thrust bearings 181, and the lip washers 184 are prevented from being rotated with the gears 183 by means of inwardly extending lips or lugs engaging with grooves longitudinally disposed formed in the small ends of the stud shafts 170. Meshing with the bevel gears 183 is another bevel gear 203 which is fixedly secured to the transmission driving shaft 1 by means of the key 204, and still another bevel gear 197 is meshed with the gears 183 and is fixedly secured to the tubular shaft 200 by means of the countersunk head rivets 198. A ball thrust bearing 205 is provided between the bevel gear 203 and the cage cap 179, and another ball thrust bearing 195 is provided between the bevel gear 197 and the cage 169. A spacing washer 226 is disposed placed between the cage cap 179 and the bearing 30; and three other spacing washers 163 are placed between the flange 158 of the shaft 127 and the bearing 156, and these spacing washers 163 have suitably formed, centrally located holes so as to be passed onto the splined shaft 127. Into an annular flange formed onto the shaft coupling 185 is a series of equally spaced notches 186 which have a free fitting relation with a pair of pawls 162. The pawls 162 are carried in diametrically opposite sides of the cage 169 and are swingingly mounted on pins 188 in the cage 169. An annular collar 166 is disposed over, and concentric with the periphery of the cage 169 and has at its front end an inwardly turned flange adapted to be engaged with a pair of lugs or teeth 187 on each of the pawls 162. A pair of angle levers 209 are actuated by a reciprocatively mounted, bifurcated actuator rod 173 which has a knob 174 carried on its upper end. The two prong ends of the bifurcated portion of the actuator rod 173 are disposed adapted to be always in operative engagement with the rear slotted ends of the approximately horizontally disposed portions of the angle levers 209, and the upper slotted ends of the approximately vertically disposed portions of the levers 209 are adapted to be always in operative engagement with a pair of studs 225 suitably located and fixedly secured in the collar 166, while the levers 209 are fulcrumed on pins 207 which are disposed in the case 85$^B$. Secured by means of rivets 168 the collar 166 is reciprocatively mounted on a pair of supporting rods 160 which, in turn, are carried in guides 159 and are limited in reciprocative movement by means of set screws 154 and 210 located in brackets 155 which project inwardly from the case cover 85$^C$. Internally formed with the collar 166 at its rear end is a series of equally spaced teeth 164 which are adapted to be engaged with another series of suitably located and fittingly formed teeth 167 which are integrally carried on the periphery of the cage 169. A spring 161 is tensioned to bear against the cage 169 and the pawl 162 and disposed so that its tension holds the pawl 162 into enmeshed position when said pawl is engaged within the notches 186 of the flanged coupling 185, and of such disposition that when the pawl 162 has been forced out of engaged position with the shaft coupling 185 said spring 161 holds the pawl in such disengaged position, said pawl being one of the pair of pawls each employed to function alike. A spring actuated detent is provided secured to case cover 85$^C$ and is disposed to be engaged with a notch 178 in the reverse actuator rod 173 when said rod is moved upward for a suitable distance. A pair of springs 189 each has one end secured in loops 190 of the case cover 85$^B$ and the other end secured to an inwardly projecting stud 208 formed on the respective one of the levers 209 and disposed so that the longitudinal centerline of each spring 189 will be passed alternately from one side to the other of the center of the respective one of the pins 207 so as to hold the collar 166 either in extreme backward position or extreme forward position and effect, respectively, engagement or disengagement of the pawls 162 with the shaft coupling 185. The bosses 149 and 172 project upward thru the floor board 153 and the floor covering 224. The knob 174 as a hand grip is conveniently located in an out-of-the-way position in front of the front seat 175 and on the centerline of the car. The transmission driving shaft 1 which is journaled for rotation in the split bearing 30 extends rearward from said bearing and is suitably large and hollow for a length of its rear portion to receive the bushings 19 and 13 into which the transmission driven shaft 2 is journaled for rotation relative to the transmission driving shaft 1; the transmission driven shaft 2 being likewise journaled adjacent its rear end in the split bearing 64. The driving gear 17 adjacent to and at the rearward end of the bearing 30 is fixedly secured upon the transmission driving shaft 1 by means of the key 31, and this gear 17 is enmeshed with a pair of gears 16 each approximately equal in size to the driving gear 17. The gears 16 are fixedly secured upon the forward ends of the pair of counter shafts 24 by means of keys 22 and nuts 23. The countershafts 24 are disposed in diametrically opposite sides of a drum 18 and are journaled for rotation in bushings 20 and 21 fitted in the drum 18 and the embossed integral portions $18^B$ thereof. The transmission driving shaft 1 is free to rotate within the bushing 27 in the drum 18 according to the relative movements of other associated parts. On the rear ends of the pair of countershafts 24 are fixedly secured the gears 15 by means of the keys 22 and nuts 23. Enmeshing with the gears 15 is a gear 14 which is relatively much larger than said gears 15, and this gear 14 is mounted for partial rotation upon a hub 33 and disposed to rotate freely thereon relative thereto except as it is limited in or prevented from such relative rotation by means of the pair of cams 34 each of which has two legs with semi-spherical bearing surfaces engaging with sockets formed into a suitably shaped forward end portion of the hub 33. The hub $14^B$ which is integral with the gear 14 has a free bearing surface of generous length to substantially mount the gear 14 upon the hub 33 for such limited rotation as is herein before mentioned. The hub 33 is fixedly secured to the transmission driven shaft 2 by means of the key 32. The supporting wall or web of the gear 14 is disposed rearward of the gear rim so that the inner or forward face of the web is in a rearward direction beyond the rear face of the gear rim substantially rendering the gear proper suitably concave to be adapted for locating the cams 34, and the bearing caps 107 within such concavity. Into the front face of the web of the gear 14 is formed suitable grooves to serve in part as bearing surfaces for fulcruming the levers 8, and wherein the bearing caps 107 secured by means of nuts 37 serve to complete the bearing surface. The annular flange 36 which is integral with the shaft portion of each of the levers 8, fits a respective slot in the web of the gear 14 preventing any movement of the levers 8 except the desired limited rotation within the bearing caps 107 and the gear web of the gear 14. The hole 500 in the web of the gear 14 is formed to allow the passage of the enlarged rear end of the lever 8 to be entered for assembling. On the centerline of the cams 34 are formed cylinders in the levers 8, and in the cylinders are pistons $8^Z$ which are forced against the cams 34 by means of springs $8^Y$ which are relatively not easily flexed, and their principal object is to provide a shock absorber or buffer not absolutely necessary to the workable operation of the device yet highly desirable. Shims $8^X$ of any selected thickness and in any quantity are employed to adjust the positions of the pistons $8^Z$ within the containing cylinders. The ends of the levers 8 which are projected forward from their integrally formed, fulcrumed shafts are bifurcated and the shoes 12 and sleeves 5 are disposed between the prongs of said bifurcated lever ends. Said prongs function as two pairs of lifting arms contacting with the inner faces of the overhanging shoulders of the pairs of sleeves 5, rectangular in cross section, reciprocatively mounted on the pair of clutch shoes 12. Said shoes 12 are of suitable fitting form and normally bearing against the periphery of a suitably lengthy, rearmost enlarged portion of the transmission driving shaft 1. The rear end face of the transmission driving shaft 1 coincides with the front face of the gear 14. The springs 7 carried in the pair of clutch shoes 12 are disposed to press apart the screws 6 from the shoes 12 and, in turn, the adjusting nuts 4 threaded onto the screws 6 are pressed against the short ends $3^P$ of the levers 3. The coiled springs 11 are secured from turning as a whole within the shoes 12 by means of having their inner ends projected into suitably disposed holes of fitting size in the shoes 12. The adjusting screws 10 have within them irregular notches enmeshing with fitting irregular outer spring ends of the springs 11. The springs 11 are tensioned so that when the adjusting screws 10 are turned into the threaded shoes 12 a positive tension tends to unscrew or move the screws radially outward, but said adjusting screws 10 are prevented from being turned to be moved outward by means of the springs 11 by means of another pair of springs 9 which are tensioned to have their ends press toward each other and to contact frictionally with the sides of the openings formed in the shoes 12 as are disposed to accommodate the passage of said springs 9. The outer diminutive ends of the adjusting screws 10 are circular in cross section and pass thru, projecting outward suitably fitted openings centrally formed in the springs 9, and are adapted to be rotated relative thereto while the shoulders adjacent to the diminutive ends bear against the springs 9 preventing the screws 10 from turning and moving radially outward. The inner ends of the springs 9 fittingly contact directly against the periphery of the shaft 1. The shoes 12 are prevented from moving forward relative to the shaft 1 by means of the spacing washers S and Z filling the space between the shoes 12 and the hub of the drum 18. The shoes 12 are prevented from moving rearward by means of the pair of straps 35 secured at their extremities to the front face of the rim of the gear 14, and are disposed to bar the shoes 12 from rearward movement relative to the shaft 1. To secure the straps 35 studs 51 may be threaded into tapped holes in the rim of the gear 14, and after the straps 35 have been positioned with the studs projecting thru suitably formed, irregular holes in the ends of the straps 35, then, the surplus projection of said studs having been riveted the straps 35 are securely fastened in place, and the riveting having squashed metal into the irregular holes the studs 51 are secured against loosening. It is preferable that the straps 35 be made from spring stock. The levers 3 are fulcrumed in the forward projections 14$^A$ formed integral with the gear rim of the gear 14 as shown; however, for the sake of accessibility in making repairs, the projections 14$^A$ may be units secured to the gear 14 by means of cap screws, or by any other common means. Inability of the levers 3 to move otherwise than to swing as desired is rendered by means of the fins 3$^F$ in fitting engagement with grooves formed in the extensions 14$^A$ of the gear 14. The short arms 3$^P$ of the levers 3 are disposed relative to the long arms of said levers and fulcrumed in a manner to provide a relatively high power ratio for the purpose of pressing the shoes 12 into clutching relation with the transmission driving shaft 1 when actuated by the centrifugal force generated in the weights 77 indirectly connected to the levers 3 by means of the hooks 81 and the bifurcated springs 75 and 42. Said springs 75 and 42 are secured to levers 3 by means of bolts 38 and nuts 39 disposed in the rearward extending extremities of said levers 3 projected backward beyond the web of the gear 14. The bifurcated springs 42 are secured against shoulders 3$^S$ of levers 3, and the combined tension of the pairs of bifurcated springs comprising 42 and 75 is adjustable by means of the elongated holes provided in the springs 75 to admit the passage of the bolts 38 and to permit longitudinal adjustment. The fingers 75$^F$ of the springs 75 overhanging springs 42 maintain alignment of said springs. The rearward extremities of the bifurcated springs 42 are secured to the ends of a pair of eveners 53 by means of rivets 83, said eveners being fulcrumed in the inner ends of the hooks 81 on rivets 82. The hooks 81 hook or cap over the outer ends of the weights 77 to effect a universal socket joint, and said weights 77 are reciprocatively carried on stud shafts 76 which terminate in a common hub integral therewith, and are fixedly secured to the transmission driven shaft 2 by means of a key 2$^K$. The weights 77 are normally pressed outward by means of the coiled springs 44 which are tensioned to bear against the inner ends of the weights 77 and the outer faces of the adjusting nuts 46 which, in turn, are carried adjustably threaded onto the stud shafts 76 and are held positioned by conventional cotter pins. The weights 77 are prevented from rotation relative to the stud shafts 76 by means of pins 76$^P$ disposed transversely thru the stud shafts 76 and project at both ends somewhat beyond the periphery of said stud shafts and into longitudinally disposed grooves fittingly formed in the weights 77 as required. Threaded into the outer ends of the stud shafts 76 and longitudinally coincident with the common centerline are cap screws 79 having suitably notched heads wherein the notches serve to receive the knob-like heads of resiliently shanked pins 80 fitting within longitudinally disposed holes formed in the stud shafts 76. Said resiliently shanked pins 80 are disposed tensioned to press the knob-like heads into fitting notches formed in the heads of the cap screws 79 to simultaneously hold the pins 80 and cap screws 79 positioned. Suitably large holes in the outer ends of the hooks 81 accommodate the disposition of the cap screws 79, while suitably disposed circular holes and projected notches therefrom in the weights 77 accommodate the disposition, respectively, of the cap screws 79 and the pins 80. The cap screws 79 are adjusted to limit the outward reciprocative movement of the weights 77 as required. Adjustably carried in laterally projecting portions of the weights 77 are the hooks 74 which are adjusted by means of cap screws 78. Said cap screws 78 are held positioned by means of pins 50 which engage with fitting notches formed in the heads of the cap screws 78. In like manner as I have used pins 76$^P$ to prevent relative rotation of the weights 77 upon the stud shafts 76 a similar means may be employed to prevent the hooks 74 from such relative movement. The hooks 74 are adjusted to make contact with the buckled side of the hinged joints of the combined connecting rods residing in the rods 67 and 40 which are hinged together upon the rivets X and caused to be buckled or rendered out of longitudinal alignment by means of springs 52 tensioned to bear against the adjusting screws 48 and the rods 67 and 40 until their offset shoulders contact, as especially shown in Fig. 13 of the drawings. The forward ends of rods 40 are fittingly disposed to form universal socket joints with the rear ends of the levers 8 projected thru the holes 500 of the gear 14.

The balls of the socket joints formed between the levers 8 and the rods 40 are riveted onto the required ends of the rods 40 during assembly. Threaded upon the rear ends of the rods 67 are the rod ends or adjusting nuts 71 fitted in the bearing blocks 70 which, in turn, are fitted onto the stud pins 69 projecting from the thrust collar 58; and as shown in Fig. 13 of the drawings the rod-end, adjusting nuts 71, the bearing blocks 70, and the stud pins 69 are enjoined to form universal joints between the thrust collar 58 and the rods 67. The thrust collar 58 is mounted for rotation upon the sleeve 56 and is freely carried upon the sets of ball bearings 59 and 57, the latter set serving to function as the end thrust bearing. The thrust collar 58 is forced to rotate with the transmission driven shaft 2 because of the pair of guides 54 fittingly engrooved in the collar 58 in a manner to allow said collar to reciprocate longitudinally relative to said guides 54 which are fixedly secured to the stud shafts 76 by any ordinary means, such as being riveted as shown. After the thrust collar and the sets of bearings 59 and 57 have been assembled upon the sleeve 56 then another collar 61 is fitted secured to the sleeve 56 by means of rivets 60, and the combination of collar 61 and sleeve 56 is carried upon sets of ball bearings 62 and 55 within which the transmission driven shaft 2 is free to rotate relative to the sleeve 56 and the attached collar 61. In opposite sides of the collar 61 are bifurcated brackets carrying pins 63 which are engaged by the inner slotted ends of the levers 102 which, in turn, are fulcrumed in the sides of the case 85$^A$ on the pins 104, while the outer ends of the levers 102 have bolted thereon lever extensions 105 which are adjustable longitudinally upon the levers 102 because of the longitudinal slots 105$^B$ formed in said lever extensions and coincident with the clamping bolts 106. The shoulders 105$^A$ bear against the front edges of the levers 102. The fulcrum joint sockets 103 are of a special dust-excluding design as well as being adapted to hold the levers 102 rigidly against any movement except the desired horizontal swinging motion. The indented portions 85$^C$ of the case 85$^A$ have openings sufficiently large to allow the entrance of the levers 102 from outside in. Also swinging clearance is provided to accommodate the required movement. Furthermore, the levers 102 are relatively wide and thin at their fulcrum joints, whereas the width overlaps the passage hole in the case 85$^A$ engrooved as shown to form dust excluding joints. Adjustable pull rods comprising the rods 97 and the rod-ends 97$^V$ are hinged to the rear pair of levers 102 by means of the pins 97$^P$, and to the front pair of angle levers 89 on their outward projecting arms 89$^V$ by means of the pins 96, the levers 89 are fulcrumed in the pair of bearing blocks 101 by means of pins 90. Each pair of bearing blocks 101 is comprised of two blocks, one below and one above each lever 89 and respectively aligned horizontally with the lower guides 85$^L$ and the upper guides 85$^U$ which are integral projections of the case 85$^A$. The bearing blocks 101 are adjustable within the guides 85$^U$ and 85$^L$ by means of adjusting screws 93 suitably threaded thru the case 85$^A$. Openings formed to accommodate the passage of the levers 89 thru the case 85$^A$ are closed by means of boots 94 of suitable, flexible material clamped between the plates 91 and the case 85$^A$ by means of cap screws 92, while said boots 94 are clamped to the outward projecting arms 89$^V$ of the levers 89. A pair of clutch shoes 28 are pivotally mounted on pins 88 carried in the bifurcated upper ends of the levers 84. Said shoes 28 and levers 84 have contacting surfaces pressed forcibly together by springs 87 effecting to frictionally hold the shoes 28 positioned as required after being automatically brought to the required position pressed into clutching relation with the drum 18 to which said shoes are fitted. In brackets 86 and 84$^I$ embossed relatively low in the case 85$^A$ the levers 84 are swingingly mounted on pins 100. Coiled springs 98 are hooked to the adjusting screws 99 and to the levers 84 and are tensioned to normally pull the pair of shoes 28 away from and out of contact with the drum 18; and likewise the levers 89 which are normally in bearing contact with the outside edges of the levers 84 are swingingly moved in a manner to effect a pull upon the pull rods 97. Further tracing the normal pulling effect of the springs 98 one will find that the outer ends of the levers 102 move forward simultaneously with the moving of the shoes 28 outward from the drum 18 while the inner ends of said levers 102 move rearward effecting rearward movement of the collar 61 and the attached sleeve 56, and the sleeve 56 acting against the thrust bearing 57 causes said bearing, in turn, to effect rearward movement of the collar 58, and simultaneously the rods 67 and 40 move rearward under tensile stress, while next in the series one finds the approximately transversely disposed, rearward lever-ends of the levers 8 being moved rearward while the approximately longitudinally disposed, forward, bifurcated ends of levers 8 move inward until stopped by means of the cams 34, and simultaneously the sleeves 5 move inward allowing the short ends 3$^P$ of the levers 3 to move simultaneously inward and rearward as they bear the clutch shoes 12 inward while the rear ends of the relatively stiff springs 42 move outward as the hooks 81 and the weights 77 simultaneously move outward while actuated by means of the springs 44 tensioned to normally force outward said weights 77. The spring 44 is disposed under relatively higher tension than the spring 98, referring to each of the two pairs of springs. The springs 98 are required to be tensioned sufficiently only to draw the shoes 28 outward when there is no force pressing them inward. In the train of parts last mentioned is also the pair of springs 7 which coact with springs 44 tending to constantly force the pair of shoes 12 into bearing relation with the transmission driving shaft 1; and it is preferable to have the springs 44 disposed to be equal to or more highly tensioned than the springs 7. When adjusted to operative condition the pairs of springs 44, 7, and 98 residing in said train of parts effect to always hold all joints and bearings of said train tightly to their same contacting surfaces so that the train is always in adjusted condition regardless of looseness in any of the joints, and because of very slight periodic movement of the train it is well adapted to hold adjustment against wear for long periods of time. Front and rear clearance is provided between the shoes 12 and the inner front and inner rear surfaces of the telescopingly disposed sleeves 5, as clearly shown in Fig. 1 of the drawings, to accommodate movement of the short ends 3ᴾ of the levers 3, but at the sides of the sleeves 5 they are slidably fitted to the shoes 12. A flange 72 integral with the transmission driven shaft 2 shoulders against a washer 73 spacing it from the bearing 64, while a washer 29 fills the space between the gear 17 and the bearing 30. The gear 17 is spaced apart from the drum 18 by means of the washer 26. Integral with or otherwise secured to the sides of the case 85ᴬ are the inclined troughs 41 of any required number suitably disposed as means to regulate the supply of oil contained in the several reservoirs partitioned off within the case 85ᴬ. The plate 65 is secured to the rear ends of the case 85ᴬ and case cover 85ᶠ by means of cap screws 66 to render the case at this point practically dust and oil tight. A novel steering wheel is provided by means of passing a straight core rod 235 thru the sleeves 244 and 250 and the levers 239 and 249 which are fixedly secured welded to the sleeves 244 and 250 respectively. Also a collar 243 is provided disposed at each end of the sleeves 250 and 244. After the straight core rod 235 has had threaded onto it such aforesaid parts it is then bent to annular form except for two diametrically oppositely disposed straight portions on which the sleeves 244 and 250 are adapted to be partially rotated. After the rod 235 has been formed as aforesaid, and its free ends have been welded together, then the outer ends 237 of the spokes projecting radially from the steering wheel hub 238 are attached welded to the formed rod 235. Vulcanite 236 is then added to cover the core rod 235 except for the straight portions on which are carried the sleeves 244 and 250. The double lever 239 is joined to the lever 249 by means of the connecting rod 242 and the rivets 241 and 248, and is also connected to a cam 246 by means of the connecting rod 262 and the rivets 240 and 245. The cam 246 is carried reciprocatively in slots having their depths triangular and widths rectangular in cross section formed in the lower face of the hub 238 and the upper face of the thrust bearing race 251 of the set of ball bearings 257; and said slots are fittingly disposed relative to the cam 246 in a manner to cause the thrust bearing race to move longitudinally relative to the steering column 254 when the cam 246 is reciprocated. Furthermore, the cam 246 is of such disposition that movement toward the steering column 254 causes the thrust bearing race 251 to move downward, and perforce thru the set of ball bearings 257 and a second thrust bearing race 502 fittingly carried in the suitably flanged upper end of the sleeve 256 and the collar 258 clamped securely onto the sleeve 256 and onto the accelerator rod 260 which is in any ordinary way connected to a motor throttle is moved downward. Return movement of the accelerator rod 260 is accomplished by means of a coiled spring 261 disposed tensioned between the floor plate 136 and the clamp 258, and hence to force the sleeve 256 from the floor plate 136 thru which the accelerator rod 260 is projected. The steering column is secured fixedly in an automobile by means of having its lower extremity clamped in any ordinary way to the vehicle side frame member 300, and clamped also near its upper extremity by means of the novel clamping mechanism which I have shown in Figures 26 and 27 of the drawings. The pair of brackets 262 are clamped to the steering column 254 by means of the bolt 263. The fittingly formed clamp ends which contact with the steering column 254 pass thru the longitudinally disposed elongated holes 265 formed in the opposite sides of the sleeve 256. By means of the bolts 264 the brackets 262 are fixedly secured to an automobile body member such as the instrument board 132 or the like. The sleeve 256 is reciprocatively carried on bushings 255 on the steering column 254. Within the column 254 in bushings 253 is journaled for rotation the tubular steering shaft 252 which has the steering wheel hub 238 fixedly secured to it in any ordinary way, or by means of the pipe plug 247 as I have shown. As is common in the art electric wires may be passed thru the tubular steering shaft 252 and the hole capped with a button for actuating a signal horn. In Figures 22 and 24 I have shown a highly desirable construction for making a clutch actuating mechanism which automatically becomes frictionless when the clutch has been positively and completely engaged. Integral with the sides of the case 85ᴮ are suitably formed guides 233 and 234 which carry to be reciprocated the square shanked hooks 232 which hook over at ends 231 the flange 216$^F$ formed integral with and disposed transversely on the rear end of the cam 216$^S$. The hook ends 231 of the hooks 232 contact against the front face of the flange 216$^F$. Disposed projected beyond the front of the ends 231 of the hooks 232 are the prong ends of the bifurcated lever 142$^S$ which when actuated by a downward movement of the treadle 135 are moved to cause said prong ends to contact forcibly with the hook ends 231 effecting backward movement of the cam 216$^S$ into unclutched position, but when the cam is forced forward by its spring actuator into the clutched position as shown the spring 229 tensioned against the boss 230 of case 85$^G$ presses the lever extension lug 228 of the lever 142$^S$ to contact with the set screw 227 which is adjusted to cause to be rendered a clearance space between the prong ends of the lever 142$^S$ and the hook ends 231 is required. Having provided the aforesaid clearance the hook ends will automatically free themselves from frictional contact with the flange 216$^F$ while said flange is rotated relative to said hook ends 231.

In Fig. 27 I have shown a comparative disposition of my encased device with relation to the driver's seat 301 and the side frame members 300 of an automotive vehicle.

In Fig. 4 I have shown a simple construction for making a pair of clutch shoes 12$^V$ to be adapted to be pressed into clutching relation with the shaft 1. This simple arrangement is not self adjusting, and an adjusting screw 4$^V$ has flattened sides 4$^F$ onto which a wrench is fitted from time to time and the desired adjustment made. It is obvious in this case that the springs 44 are alone relied upon to bear the shoes 12$^V$ into clutching relation with the shaft 1 when there is no effective centrifugal force and when the torque is not an actuating force. However, in either case the springs 44 are tensioned to function as aforesaid, for the principal object of the springs 7 is to cooperate in the performance of effecting automatic adjustment of the shoes 12 as will be more particularly pointed out.

Now that one is familiar with the details of construction, I shall endeavor to fully and clearly explain the use of my device.

Because of the very intricate involution of principles it would seem the best plan to proceed to a thorough understanding by imagining the device to be in actual service in an automobile, and while following the demonstration I shall explain the exemplary use of the device.

In lieu of the ordinary power-control device imagine my improved device to be installed in an automobile of common design except that I use a 3 to 1 rear axle ratio of gearing, as is preferable in lieu of the ordinary approximately 4 to 1 ratio.

My improved device may be designed and adjusted so as to automatically clamp itself positively in high gear at most any suitable vehicle speed, but for exemplary demonstration the device will be considered as adjusted to be actuated by means of centrifugal force to be always clamped in high gear when the vehicle is moving at a rate of speed above eight miles per hour, regardless of the torque generated.

Reference to high gear is understood to be gearing of a narrow ratio, and low gear to be gearing of a broad ratio.

For demonstration, then, the transmission is conditioned in high gear when the clutch shoes 12 grip the shaft 1 with such force that said shaft 1 does not rotate within and relative to said shoes 12; and low gear is effected when the drum 18 does not rotate within the clutch shoes 28 actuated perforce of torque.

Instead of the theoretical infinite number of gearing ratios, for practical demonstration consider the range of gearing from ultimate low to ultimate high gear to be divided into ten equal divisions and call the ultimate low #1 gear and the ultimate high #10 gear, then, #2, #3, #4, #5, #6, #7, #8 and #9 will be relative intermediate gears.

With the foregoing in view, and for exemplary illustration, the vehicle is parked at rest on a sandy road in a condition such that a large amount of torque is generated in the transmission driven shaft 2 before the impelling force from the motor will cause the vehicle to move. The vehicle is conditioned to move in a forward direction by the engagement of the pawls 162 with the shaft coupling 185, said pawls being actuated manually by means of the rod 173 which is capped with the hand grip ball 174 as shown in Fig. 18 of the drawings. The vehicle is locked into inoperative condition with the treadle 135 held down by means of one of the teeth 135$^T$ of the treadle 135 in engagement with the flange 136$^F$. Then, the clutch cam 216 is out of engagement with the rollers 129 and the foot 144$^A$ integral with the shank 144 is disposed swung directly under the lever extension 142$^A$, and the lock bolt 145 is projected into the hole M of the shank 144. I unlock the device by turning the key 151 in the lock 223 removing the lock bolt 145 from engagement with the shank 144. I start the motor by means of pressing downward on the motor starter plunger 150, and after swinging the handle of the rod 134 to the position shown the foot 144$^A$ is directly under the starter plunger 150 and not in interference with the lever extension 142, then, with my left foot I release the treadle 135 and allow the spring 143 to force the forward end of the cam 216 into engagement with the rollers 129 while the flywheel 115 is rotating relatively slowly, and as I allow the spring 143 to force the cam forward I accelerate the motor so that the velocity of rotation of the flywheel 115 gradually increases simultaneously as the cam gradually moves forward. The motor, then, must labor by doing the work of forcing the rollers 129 outward against the variable centrifugal force generated in the weights 110 because the periphery of the cam 116 is variably elliptical as hereinbefore described. The clutch is positive and in non-slipping engagement when the cam 216 is forced to the position shown, where its major axis is coincident with the rollers 129 and is greater than the shortest distance between them while said rollers are in their extreme outward position and held stopped by the buffer springs 128. Now, the cam 216 being clutched to rotate with the motor crankshaft 113, rotation is effected in the splined shaft 127, the shaft coupling 185, the gear cage 169 and ensemble, and the transmission driving shaft 1. Then, the gear 17, which is keyed to the shaft 1, must rotate at crankshaft speed. It will be observed that to rotate the shaft 2 all propelling force must be transmitted thru the cams 34. Also, it will be noted, that centrifugal force transmitted from the weights 77 effects to force both legs of each of the cams 34 into their base sockets, and that tortional resistance, or torque, in the transmission driven shaft 2 effects to force one leg of each of the cams 34 to rise out of its base socket and thus cause the forward end of the lever 8, each of the pair, to rise.

Now, as aforesaid, the condition is such that a large amount of torque is generated in the transmission driven shaft 2 before the vehicle will move. The vehicle is at rest and no centrifugal force is generated in the shaft 2. The combined force of the springs 7 and the springs 44 are pressing the shoes 12 into slight clutching relation with the transmission driving shaft 1. This slight clutching effect of the shoes 12 plus the normal resistance (potential energy and journal friction) of the gears 15 and 16 against turning causes the gear 14 to rotate very slightly upon the hub 33 almost instantly after the motor power has been engaged. The cams 34 raise the forward ends of the levers 8, the springs 44 are compressed, the clutching effect of the shoes 12 is less, the shoes 28 are pressed against the drum 18, the gear 17 transmits driving force thru the gears 16 and 15 to the gear 14, then the gear 14 rotates a little more upon the hub 33, the shoes 28 grip the drum 18 more forcibly until the vehicle moves forward in low or #1 gear while the drum 18 does not rotate, and the gear 17 drives the gears 16 which drive the shafts 24 which drive the gears 15 which drive the gear 14 which drives the shaft 2 which is connected by a universal joint to drive the rear axle to drive the rear wheels to drive the vehicle.

Always, when using the self-adjusting clutch shoes 12 in lieu of the shoes $12^V$, even after the springs 44 are compressed there is a tendency to drive in direct high or #10 gear because there is still the force of the springs 7 pressing the shoes 12 into a slight frictional contact with the transmission driving shaft 1. As the vehicle moves, centrifugal force throws the weights 77 outward and, simultaneously, said torque becomes less. The forward ends $3^P$ of the levers 3 press the shoes 12 to have more friction with the shaft 1 and the tendency to drive in #10 gear becomes greater, and simultaneously the shoes 28 become drawn away from contact with the drum 18 and said drum rotates within said shoes 28 and the shaft 1 rotates within and relative to the shoes 12 with increased friction and increased tendency to drive in #10 gear. But, #10 gear is effected only when the shaft 1 does not rotate within and relative to the shoes 12 which have positive driving connection with the gear 14 which has connection, by means of the cams 34, to the hub 33 which is keyed to the transmission driven shaft 2. Then, as said centrifugal force, actuating the weights 77, gradually becomes greater the actuating effect of said torque becomes neutralized and made void, and the movement of the vehicle, now traveling a road conditioned to be traveled in #10 gear, is accelerated rapidly as I open the motor throttle and the gearing ratios progress from #1 to #2 to #3 to #4 to #5 to #6 to #7 to #8 to #9 and ultimately to #10.

Now, the car is traveling in direct or high gear at a speed of eight miles per hour, I open the motor throttle to quickly pass the car ahead. When I open the throttle I automatically increase said torque, but within the limit of the power of the impelling motor to increase the torque the adjustment is such that at eight miles per hour said centrifugal force holds the mechanism always clamped into #10 gear. Now, the car traveling on a normally hard road which is fairly level, I close the motor throttle so that it travels along at a speed of four miles per hour, but because of the normally good road condition there is not a relatively large amount of torque generated to throw the mechanism out of #10 gear; therefore, at a speed of four miles per hour it travels along in high gear. As it moves onward and approaches a slight elevation in the road, and as it travels up the incline said torque slightly increases, but practically the whole transmission mechanism is rotating enjoined as a flywheel which overcomes slight resistance, and it rides over the elevation and travels smoothly on. Still, it is traveling at a speed of four miles per hour, I suddenly open the motor throttle to quickly push the vehicle ahead, torque is suddenly increased and the mechanism drops back into #9 gear, and inasmuch as the motor speed has been accelerated, dropping back to #9 gear does not slow up the movement of the vehicle but it gradually accelerates and centrifugal force increases and the vehicle is, after a few moments, driven in #10 gear.

Now, traveling at a speed of twenty miles per hour it ascends a hill and the torque becomes great, the motor being overworked slows down until the speed of the vehicle drops to six miles per hour. The torque causes the shaft 1 to slip within the shoes 12, and the drum 18 is caused to rotate less rapidly, yet freely. Said drum 18 (perforce of its own kinetic energy plus the impelling force from the motor acting upon the gears 16 and 17 and the friction between the shoes 12 and the shaft 1) is not easily caused to cease to rotate, but is slowed down until #8 gear is selected and carries the vehicle over the summit where again the mechanism drifts back into #10 gear.

After a time in service slippage of the hardened shaft 1 within the softer shoes 12 has caused a minute quantity of metal to be worn away from the clutching surfaces of the shoes 12. This wearing away was caused under pressure such that the springs 9 have been forced upward in the same measure that the shoes 12 have been worn away, and there is the same measure of clearance between the springs 9 and the shoulder surfaces of the adjusting screws 10 because now it is traveling at a speed of ten miles per hour and the screws 10 are under pressure from the screws 6 from the nuts 4 from the levers 3 from the centrifugal force generated in the weights 77. Now I harshly apply the brakes to the rear wheels, torque is generated and the mechanism is conditioned to function in #1 gear with the springs 44 compressed so that the springs 7 separate the screws 6 from contact with the screws 10, then the springs 11 simultaneously effect the unscrewing of the screws 10 until they are moved outward to be again in shoulder contact with the springs 9, thus automatically maintaining the original perfect adjustment. Inasmuch as the governing force is always in the same direction a relatively loose fitting screw 10 may be used to insure perfect functioning.

The relatively large shoes 28 wear away so slowly that they function for a long time in service (which is periodic) before adjustment is necessary. However, even after very bad adjustment they will continue to function because of the "leeway" or range within the limit to vary the motor speed. For example, the shoes 28 are worn away to cause bad adjustment and the vehicle is parked and not moving, then to effect movement I engage the clutch and the vehicle does not begin to move at the moderate motor speed which will effect movement when there is fairly good adjustment, but by means of accelerating the motor speed I increase the friction between the shoes 12 and the shaft 1 until the gear 14 is partially rotated enough to affect the cams 34 and simultaneously cause the shoes 28 to be pressed against the drum 18. And when my novel clutch mechanism is employed (almost any of the commonly used clutch mechanisms may be adapted substituted in my device) the aforesaid performance is accentuated with the desired effect of most certainly shifting the device into operative condition regardless of bad adjustment. For example, the vehicle is not moving and the clutch is "out"; now I allow the spring 143 to force the cam 216 into clutching relation with the rollers 129. During the performance of bringing the speed of rotation of the cam 216 to equal that of the flywheel 115 the impelling force is slightly pulsated because of the fact that there is alternately propelling effect and non-propelling effect as the rollers 129 travel the variable periphery of the cam 216. The pulsating of the impelling force is most accentuated when one pair of rollers 129 is used, and it is obvious that by means of employing more rollers 129 the magnitude of the impulse is lessened. For example, when I use two pairs of rollers 129 one of the pairs is in impelling relation with the cam 216 practically all the time. However, the wearing away of the shoes 28 is so gradual that after poor adjustment is noticed the operator has efficient use of the device until it is convenient to resort to the means of adjustment provided by the adjusting screws 93, preferably; or he may adjust the rods 97.

It is understood that all parts of my device may be designed and made in any known manner from any suitable material to be best adapted for the requirement; therefore, the shoes 12 and 28 and bushings and bearings employed in the device may be provided with oil grooves and oil holes suitably disposed to insure the required lubrication.

Again, the vehicle is not moving, then I gradually allow the cam 216 to engage with the rollers 129, the power is smoothly applied when the engagement is allowed to take effect gradually, but, should I engage the clutch suddenly, the impulse is absorbed partially in the springs 125, further in the sliding friction between the shoes 12 and the shaft 1, and still further when the impulse is great enough to partially rotate the gear 14 and affect the cams 34 it will be diminished in the springs $8^Y$ and lost in the springs 44; thus the inability of shock to cause injury to the mechanism.

As the vehicle moves forward the gear cage 169 and the mechanism enjoined therein rotates with the effect of a flywheel, dips into and throws oil over the mechanism from the reservoir adapted in the bottom of the case 85ᴮ. When the enjoined transmission mechanism, including the drum 18, the gears 15 and 16, the stud shafts 76 and the weights 77, rotates as a flywheel, then oil is dipped from suitably located reservoirs and thrown over the mechanism and onto the sides of the case 85ᴬ. As the oil flows down the sides of the case much of it enters the troughs 41 which are of any required number and disposed to guide the flow of oil to fill the reservoirs of the upper level from which the oil may overflow to a lower level, and thus the oil supply is regulated.

As the vehicle travels along at a speed of thirty miles per hour the weights 77 are thrown out against the heads of the cap screws 79 and are stopped from further outward movement. The springs 75 and 42 are flexed and disposed under tension forcing the shoes 12 to clutch the shaft 1. Simultaneously, the extreme outward position of the weights 77 has affected each of the combined connecting rods having component parts 67, 40, 52 and 48, and caused them to be straightened and lengthened and thus allow the springs 98 to hold the shoes 28 away from contact with the drum 18 to effect considerable clearance. The springs 87 frictionally hold the shoes 28 adjusted relative to the holder levers 84. In the clutch mechanism the springs 108 flex and the weights 110 thrown outward are stopped by means of the lugs 221 integral with the flywheel 115.

After stopping the vehicle and the clutch is "out," to shift the mechanism into reversing condition, I grip the knob 174, pull upward, the collar 166 is forced forward, the flange 136 engages the forward ones of the teeth 187, the pawls 162 are forced from engagement with the shaft coupling 185 and are held disengaged by means of the springs 161 thrown past the centers of the pins 188, the springs 189 are moved upward past the centers of the pins 207, and the detent 177 engages with the notch 178 to lock the mechanism into reversing condition with the teeth 164 enmeshed with the teeth 167.

Simultaneously with the engaging of the clutch I partially rotate one of the sleeves 250 of the steering wheel and at the same time steer the vehicle. Clutching the cam 216 rotates the shaft 127, the tubular shaft 200 and the bevel gear 197 riveted thereon. Thru the bevel gears 183 is imparted reverse motion to the bevel gear 203, and to the transmission driving shaft 1. Hence, it is obvious that the same results are effected in propelling the vehicle backward, likewise as forward.

When shifting the reversing mechanism back to condition for propelling the vehicle in a forward direction I may, if necessary, slightly engage the clutch to find a mesh for the pawls 162.

After I stop the vehicle in a garage with the intention of letting it remain unused for a week I may lock the clutch into the position shown, with the spring 143 disposed under the least tension. The bolt 145 is then in locked position in the rectangular hole N. It is obvious that the motor starter plunger 150 cannot be actuated when thusly locked by means of the interfering foot 144ᴬ. Hence, I cannot start the motor until the lever extension 142ᴬ is moved upward to allow the foot 144ᴬ to be swung from interference with the starter plunger 150 and in a position to insure the complete disengagement of the clutch.

The gears 14, 15, 16 and 17 are preferably of the silent, smooth meshing type such as herringbone or spirally cut gears.

For convenience and to facilitate making adjustments, handhole openings fitted with dust tight covers may be suitably located in the case which houses the mechanism. It is particularly obvious that the mechanism is well adapted to handhole adjustment because of a nature to be rotated into positions of accessibility.

Likewise, the device is particularly adapted to cheap production because it is generally made of pairs of like parts.

If I employ the shoes 12ⱽ in lieu of the shoes 12, it is obvious that when the mechanism is actuated by the force of great torque and in low gear the springs 44 are compressed and the shoes 12ⱽ have no clutching effect upon the shaft 1.

The springs 49ˢ may be adapted and suitably disposed to prevent certain undesirable tendencies of centrifugal force affecting the hooks 74 by means of the eye-screws 49ᴳ and Fig. 15 of the drawings this pair of springs 49ˢ may be adjustably tensioned joining the common hub of the stud shafts 76 to the hooks 74 by means of the eye-screws 49ᶜ and the special machine screws 49. A series of holes formed in each of the heads of the machine screws 49 are disposed to permit adjustment of the springs 49ˢ. Hooking spring ends of the springs 49ˢ into different ones of each series of holes provides different adjustment of the tension of each of the springs 49ˢ.

In anticipation of the possible desirability of using them in my device I have shown certain elaborate constructions wherein it is obvious that a single part may be adapted to function in lieu of a plurality of parts I have shown employed for the purpose. For example, one spring 42 may be employed in lieu of the two springs 42 and 75. In this case the spring 42 will not be adjustable and will be relatively very stiff, but will flex as desired suitably well within the breaking point of the lever 3.

Likewise other examples of similar variations and substitutions might be mentioned which are assumed to be clearly obvious. And likewise as I may wish to substitute a certain few parts to perform in like manner as the larger number of parts they replace, also I may desire to alter the construction and rearrange certain parts and mechanisms in my device so as to embody fewer parts, simplify and cheapen the construction, and yet retain the nature to perform under substantially the same principles with substantially the same results. To illustrate an example of such an alternate construction I have shown in Fig. 5<sup>A</sup> a novel means to prevent the drum 18 from rotating when, perforce of great torque, low gear is effected to drive the vehicle forward. When employing this alternate means the shoes 28 are not used; and other parts hereinbefore described which are not used are the levers 89, 102, and 8, the cams 34, the rods 97, 40 and 67, the hooks 74, the springs 49$^S$, the sleeve 56, the collar 58, the guides 54, and a number of other related parts which will be too obvious to need mention. Inasmuch as the cams 34 are not used the hub 33 is formed integral with the gear 14, and therefore said gear 14 is positively secured keyed to the transmission driven shaft 2. The drum 18 is mounted in the manner as hereinbefore described. A portion of the drum 18 is cut away to form the cavity 18$^P$ which is disposed in the rim and intermediate the front face and the rear face of said drum 18. Within the cavity 18$^P$ is swingingly mounted the pawl-lever 103 disposed to have a weighted long end 703$^A$ always located within the periphery of the drum 18 and a short end 703$^E$ disposed to be alternately projected beyond said periphery and located within said periphery. Fulcrumed upon the pin 704 which extends from the front face to the rear face of the drum 18 and is perpendicular to said faces the pawl-lever 703 is actuated by means of a spring 702 to cause the short end 703$^E$ of said pawl-lever to be projected beyond the periphery of the drum 18 until rotation of said drum causes centrifugal force to be generated to move the weighted end 703$^A$ nearer to the periphery of said drum 18 and simultaneously move the short end 703$^E$ within said periphery. The spring 702 is relatively lightly tensioned and has one end hooked thru a hole 703$^B$ formed in the pawl-lever 703, and the other end is hooked over a pin 701 carried in the drum 18. A lug 705 which may take the form of a large bolt-head is disposed secured in the side or bottom of the case 85$^A$ and located to be engaged by the short end 703$^E$ of the pawl-lever 703 when said short end 703$^E$ is projected beyond the periphery of the drum 18, and the disposition of said pawl-lever is such that engagement of its short end 703$^E$ with the lug 705 prevents rotation of the drum 18 when torque effects a ruling tendency to rotate the drum 18 in a reverse direction relative to the direction of rotation of the motor crankshaft 113, and the disposition of said pawl-lever 703 is such that the drum 18 is permitted to rotate when the torque becomes less, or its effect neutralized by means of centrifugal force, and the ruling tendency is to rotate the drum 18 in the same direction as the rotation of the motor crankshaft 113, said latter ruling tendency being effected by means of the normal resistance against rotation of the shafts 24 and the gears secured thereon when suitably favored by means of the shoes 12 clutching the transmission drive shaft 1 as effected proportionately to the amount of centrifugal force generated in the weights 77. It is preferred to employ two of the pawl-levers thusly carried in the rim of the drum 18 and disposed diametrically opposite each other. And it is preferred to have several of the lugs 705 disposed equally spaced in a semicircular shaped portion of the case 85$^A$, and it is obvious that the lugs 705 may be formed integral with the case 85$^A$. Recalling that certain parts hereinbefore mentioned which are essential to effect both forward and reverse rotation of the transmission driven shaft 2 are eliminated when employing this embodiment, and therefore the reversing mechanism must be located rearward of the shaft 2. However, the operation and results are substantially the same as hereinbefore described. Torque effects low gear when it forces the drum 18 to reverse and be stopped by means of the engagement of a pawl-lever 703 with a lug 705. Movement of the vehicle generates centrifugal force in the weights 77 which act in connection with hereinbefore mentioned adjoining parts to effect the clutching of the shoes 12 onto the transmission drive shaft 1. When the drum 18 does not rotate low gear is effected. When the drum 18 rotates at motor crankshaft speed high gear is effected. When the drum 18 rotates less rapidly than the motor crankshaft intermediate gearing ratios are effected and the power ratio of each of the infinite number of intermediate gears is proportionate to the relative rotation of the drum 18 to the motor crankshaft when positively clutched. The tendency to rotate the drum 18 in a forward direction may be varied to suit a wide range of requirements by means of varying the diameter of the countershafts 24 within the relatively altered bushings 20 and 21 in a manner to alter the effect of the journal friction in rotating the drum 18. Likewise it is obvious that instead of employing two countershafts 24 journaled in the drum 18 three or four of said countershafts may be used with gears 15 and 16 carried secured upon them, thus permitting each of said gears to be of relatively smaller diameter proportionately as the work is divided among more of them. The springs 125 (of the centrifugal clutch shown in Figs. 18 and 20) may be omitted and there still be a working construction when the cam 216 is fixed directly and positively to the shaft 127. And it will be obvious, further, that this particular kind of centrifugal clutch (shown in Fig. 18 and in which variable resistance is worked against by moving the centrifugally operating weights 110) may be employed in lieu of the other centrifugally operating clutch forms and arrangements which I have shown and this type of clutch substituted to effect substantially the same results when suitably fitted in my device, the shaft 127 becoming the shaft 1, to vary gradually the ratio of speed transmission. Obviously I would employ the gear 14 as the carrier for the centrifugally operating clutching members in lieu of the carrier 115 and obviously the cam 216 may be a fixed element of the shaft 1.

While I have illustrated and described a fair working example of my improvements I do not wish to be understood as confining myself to the specific details of construction and formation of the elements shown, as under the spirit of my invention I believe that I am entitled to employ a wide variation of detail such as may fall within the scope of the appended claims.

Having thus described my invention, what I claim as new and desire to secure by Letters Patent, is:—

1. In a device of the class described, a driving shaft to be connected to the power source, a gear thereon, a driven shaft, a gear thereon, a gear assembly positively connecting the gears on the driving and driven shafts, said gear assembly including a countershaft and pinions revoluble about the axis of the driving shaft, a drum associated with the countershaft and pinions concentrically of the driving shaft and revolving therewith, in combination with centrifugally operating clutch members acting upon the driving shaft and in sliding contact therewith to control the speed of revolution of the countershaft and pinions whereby to vary gradually and automatically the ratio of speed transmission.

2. In a device of the class described, a driving shaft to be connected to the source of power, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, said countershaft having a suitable portion of its length journaled in said drum and having a diameter proportionate to the diameter of the gears thereon to afford sufficient resistance to rotation to overcome moderate resistance torque in the driven shaft but yielding to rotation when said resistance torque exceeds a certain limit, in combination with centrifugally operating clutch means acting frictionally between the ensemble carried upon and including the driving shaft and the ensemble carried upon and including the driven shaft to control the speed of revolution of the countershaft and pinions whereby to vary gradually and automatically the ratio of speed transmission.

3. In a device of the class described, a driving shaft to be connected to the power source, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, in combination with clutch means acting frictionally between the ensemble on and including the driving shaft and the ensemble on and including the driven shaft to control the speed of revolution of the countershaft and pinions whereby to vary gradually the ratio of speed transmission, said clutch means comprising a clutch shoe, a lever, and a centrifugally operating weight revolving with the driven shaft, said lever operatively connecting said weight to said clutch shoe, said clutch shoe positively connected to the ensemble on and including the driven shaft and in sliding contact with another element of the ensemble on and including the driving shaft.

4. In a device of the class described, a driving shaft to be connected to the source of power, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, in combination with clutch means acting frictionally between the ensemble on and including the driving shaft and the ensemble on and including the driven shaft to control the speed of revolution of the countershaft and pinions whereby to vary gradually the ratio of speed transmission between low and high, said clutch means comprising a clutch shoe positively connected to the ensemble on and including the driven shaft and in sliding contact with another element of the ensemble on and including the driving shaft, a resilient lever, means to limit the flexing of the resilient lever, and a centrifugally operating weight revolving with the driven shaft, said lever operatively connecting said weight to said clutch shoe.

5. In a device of the class described, a driving shaft to be connected to the source of power, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, in combination with clutch means acting frictionally between the ensemble on and including the driving shaft and the ensemble on and including the driven shaft to control the speed of revolution of the countershaft and pinions whereby to vary gradually the ratio of speed transmission between low and high, said clutch means comprising a clutch shoe positively connected to the ensemble on and including the driven shaft and in sliding contact with another element of the ensemble on and including the driving shaft, a resilient lever, means to adjust the resiliency of the lever, means to limit the flexing of the lever, and a centrifugally operating weight, said lever operatively connecting said weight to said clutch shoe.

6. In a device of the class described, a driving shaft to be connected to the power source, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, in combination with clutch means acting frictionally between the ensemble on and including the driving shaft and the ensemble on and including the driven shaft to control the speed of revolution of the countershaft and pinions whereby to vary gradually the ratio of speed transmission, said clutch means comprising a clutch shoe, a lever, and a centrifugally operating weight revolving with the driven shaft, said lever operatively connecting said weight to the clutch shoe, said clutch shoe positively connected to the ensemble on and including the driven shaft and in sliding contact with another element of the ensemble on and including the driving shaft, and means to adjust the lever relative to the clutch shoe.

7. In a device of the class described, a driving shaft, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, in combination with clutch means acting frictionally between the ensemble on and including the driving shaft and the ensemble on and including the driven shaft to control the speed of revolution of the countershaft and pinions whereby to vary gradually the ratio of speed transmission, said clutch means comprising a clutch shoe, a lever, a centrifugally operating weight, said lever operatively connecting the weight to the clutch shoe, said clutch shoe positively connected to an element of the ensemble on and including the driven shaft and in sliding contact with another element of the ensemble on and including the driving shaft, and means to adjust automatically said lever relative to said clutch shoe.

8. In a device of the class described, a driving shaft, a gear thereon, a driven shaft, a gear thereon, a gear assembly positively connecting the gears on the driving and driven shafts, said gear assembly including a countershaft and pinions revoluble about the axis of the driving shaft, a drum carrying the countershaft and pinions and revolving therewith, in combination with clutch means acting frictionally between the ensemble on and including the driving shaft and the ensemble on and including the driven shaft to control the speed of revolution of the countershaft and pinions whereby to vary gradually the ratio of speed transmission, said clutch means comprising a clutch shoe connected to the ensemble on and including the driven shaft and in sliding contact with another element of the ensemble on and including the driving shaft, a resilient lever, means adjustable to limit the flexing of the resilient lever, and a centrifugally operating weight, said lever operatively connecting the weight to the clutch shoe.

9. In a device of the class described, a driving shaft, a gear thereon, a drum rotatable on the shaft, a countershaft carried by the drum and revoluble about the driving shaft, a gear on the countershaft in mesh with that on the driving shaft, a second gear on the countershaft, a driven shaft, a gear rotatable with said driven shaft and in mesh with the last named gear, said gears including gears with herringbone and spirally cut teeth to afford maximum silence and smoothness of operation, in combination with clutch means frictionally connecting the ensemble on and including the driving shaft and the ensemble on and including the driven shaft, said clutch means operating centrifugally to effect variable clutching pressure changing proportionately with the speed of the driven shaft to vary gradually the speed ratio between the driving and driven shafts.

10. In a device of the class described, a driving shaft to be connected to the power source, a gear thereon, a driven shaft, a gear thereon, a gear assembly positively connecting the gears on the driving and driven shafts, said gear assembly including a countershaft and pinions revoluble about the axis of the driving shaft, in combination with clutch means to control the speed of revolution of the countershaft and pinions whereby to vary gradually the ratio of speed transmission between low and high, said means being automatically controlled by the resistance torque acting thru the gears to retard the revolution of said countershaft, and centrifugal force acting thru the clutch means to impel revolution of the countershaft, means to prevent reverse revolution of the countershaft, and means for driving said driven shaft in a forward or reverse direction relative to the direction of power at the source.

11. In a device of the class described, the combination of a driving shaft, a load-carrying driven shaft aligned therewith, power transmitting means including a train of gears in connection with said driving shaft with one of the gears secured concentrically to the driving shaft, power transmitting means in connection with said driven shaft, and means carried by the last named means bearing with centrifugal force frictionally on the other whereby to vary gradually the ratio of speed transmission, a case, the ensemble carried on and including the driving and driven shafts journaled for rotation in said case, oil reservoirs in said case and disposed to hold oil at different levels, and means to maintain the oil levels within limits to adequately lubricate the device.

12. In a device of the class described, the combination of a driving shaft, a load-carrying driven shaft aligned therewith, means connecting said shafts whereby to drive the latter by the former, said connecting means including a train of gears in which one gear is secured concentrically to the driving shaft and another to the driven shaft, and radially reciprocable weight members revoluble about the axis of the driven shaft with velocity changing proportionately with the speed of the driven shaft to actuate automatically a friction clutch of the means connecting the shafts whereby to vary gradually the ratio of speed transmission, said train of gears including herringbone gears to afford maximum silence and smoothness of operation.

13. In a device of the class described, a driving shaft, a load-carrying driven shaft aligned therewith, power transmitting means in connection with said driven shaft, power transmitting means including a train of gears in connection with said driving and driven shafts, one gear of the train being secured concentrically to the driving shaft and another concentrically to the driven shaft, and means carried by the former means and bearing thru centrifugal force on the latter whereby to vary gradually and automatically the ratio of speed transmission, said train of gears including gears with spirally cut teeth to afford maximum silence and smoothness of operation.

14. In a device of the class described, the combination of a driving shaft, a load-carrying driven shaft aligned therewith, power transmitting means in connection with the driven shaft, power transmitting means including a train of gears in connection with the driving and driven shafts, and radially reciprocable weight members carried by the first named means and bearing centrifugally on the other thru resilient levers of the first named means whereby to vary gradually the ratio of speed transmission from low to high.

15. In a device of the class described, the combination of a driving shaft, a load-carrying driven shaft aligned therewith, means connecting said shafts whereby to drive the latter by the former, said means including a train of gears in which one gear is secured concentrically to the driving shaft and another to the driven shaft, and centrifugally operating means bearing frictionally on other portions of said connecting means whereby to vary gradually the ratio of speed transmission, a clutch device to connect gradually the driving shaft to the source of power, said clutch device including a reciprocating cam adapted for rotation with said driving shaft, rollers connected to the source of power and adapted to travel the periphery of said cam and to contact therewith perforce of centrifugal pressure changing proportionately with the speed of a rotating element driven from the power source.

16. In a device of the class described, the combination of a driving shaft, a load-carrying driven shaft aligned therewith, means connecting said shafts whereby to drive the latter by the former, said means including a train of gears in which one gear is secured concentrically to the driving shaft and another to the driven shaft, and centrifugally operating means bearing frictionally on other portions of said connecting means whereby to vary gradually the ratio of speed transmission, a clutch device to connect gradually the driving shaft to the source of power, said clutch device including a reciprocating cam adapted for rotation with said driving shaft, rollers connected to the source of power and adapted to travel the periphery of said cam and to contact therewith perforce of centrifugal pressure changing proportionately with the speed of a rotating element driven from the power source, a steering hand wheel for steering a vehicle, movable elements carried upon the hand wheel and adapted to be moved relative thereto, means to connect the last named elements to a motor throttle to manually control the centrifugal pressure operating in the last named clutch device.

17. In a device of the class described, the combination of a driving shaft, a load-carrying driven shaft aligned therewith, means connecting said shafts whereby to drive the latter by the former, said means including a train of gears in which one gear is secured concentrically to the driving shaft and another to the driven shaft, and centrifugally operating means bearing frictionally on other portions of said connecting means whereby to vary gradually the ratio of speed transmission, a clutch device to connect gradually the driving shaft to the source of power, said clutch device including a reciprocating cam adapted for rotation with said driving shaft, a rotating element adapted to be connected to the power source, rollers connected to said rotating element and adapted to travel the periphery of said cam and to contact therewith perforce of centrifugal pressure changing proportionately with the speed of the rotating element driven from the power source, means to shift the rollers out of operative relation with the cam, and means to lock the rollers out of operative relation.

18. In a device of the class described, the combination of a driving shaft, a load-carrying driven shaft, a system of differential-planetary gearing operatively connecting the driving shaft to the driven shaft, said system including a gear concentrically connected to the driving shaft and another concentrically connected to the driven shaft, a gear carrier loosely mounted on the driving shaft for relative rotation to said driving shaft, a countershaft journaled for rotation in the gear carrier and revolving therewith, gears fixed to the countershaft and in operative connection with the aforesaid gears, means to control the speed of revolution of the countershaft, clutch means operatively connecting the ensemble on and including the driving shaft to the ensemble on and including the driven shaft, said clutch means including centrifugally operating clutch elements in positive connection with the ensemble on and including the driven shaft and a fixed element of the driving shaft clutched by said clutching elements to vary gradually the ratio of speed transmission.

19. In a device of the class described, the combination of a driving shaft, a load-carrying driven shaft, a system of differential-planetary gearing operatively connecting the driving shaft to the driven shaft, said system including a gear concentrically connected to the driving shaft and another concentrically connected to the driven shaft, a gear carrier loosely mounted on the driving shaft for relative rotation to said driving shaft, a countershaft journaled for rotation in the gear carrier and revolving therewith, gears fixed to the countershaft and in operative connection with the aforesaid gears, means to control the speed of revolution of the countershaft, clutch means operatively connecting the ensemble on and including the driving shaft to the ensemble on and including the driven shaft, said clutch means including centrifugally operating clutching elements in positive connection with the ensemble on and including the driven shaft and a clutched element in positive connection with the ensemble on and including the driving shaft to vary gradually the ratio of speed transmission, a case, said ensembles journaled for rotation in the case, a centrifugally operating pawl carried by the gear carrier to coact with the case to prevent retrograde rotation of the carrier.

Signed at Lansing, in the county of Ingham and State of Michigan, this 25th day of January, A. D. 1927.

GAIL H. HINES.